United States Patent [19]

Kuperstein

[11] Patent Number: 4,884,216
[45] Date of Patent: Nov. 28, 1989

[54] NEURAL NETWORK SYSTEM FOR ADAPTIVE SENSORY-MOTOR COORDINATION OF MULTIJOINT ROBOTS FOR SINGLE POSTURES

[76] Inventor: Michael Kuperstein, 40 Longwood Ave., Brookline, Mass. 02146

[21] Appl. No.: 118,828

[22] Filed: Nov. 9, 1987

[51] Int. Cl.⁴ ............................................. G06F 15/46
[52] U.S. Cl. ............................... 364/513; 364/571.05; 364/200; 364/274.9; 364/900; 364/972.4; 901/47
[58] Field of Search ................... 364/513, 516, 571.01, 364/571.05, 478, 559, 191–193, 200 MS File, 900 MS File; 901/9, 47; 356/2, 375, 376; 358/101, 107

[56] References Cited

U.S. PATENT DOCUMENTS

| | | | |
|---|---|---|---|
| 4,146,924 | 3/1979 | Birk et al. ............................ | 364/513 |
| 4,305,130 | 12/1981 | Kelley et al. ......................... | 364/513 |
| 4,402,053 | 8/1983 | Kelley et al. ......................... | 364/513 |
| 4,412,293 | 10/1983 | Kelley et al. ......................... | 364/513 |
| 4,481,592 | 11/1984 | Jacobs et al. ........................ | 364/513 |
| 4,639,878 | 1/1987 | Day et al. ............................ | 364/513 |
| 4,725,965 | 2/1988 | Keenan ............................... | 364/513 |
| 4,727,471 | 2/1988 | Driels et al. ......................... | 364/513 |

Primary Examiner—Joseph Ruggiero
Attorney, Agent, or Firm—Sprung Horn Kramer & Woods

[57] ABSTRACT

A neural-like network system that adaptively controls a visually guided, two-jointed robot arm to reach spot targets in three dimensions. The system learns and maintains visual-motor calibrations by itself, starting with only loosely defined relationships. The geometry of the system is composed of distributed, interleaved combinations of actuator inputs. It is fault tolerant and uses analog processing. Learning is achieved by modifying the distributions of input weights in the system after each arm positioning. Modifications of the weights are made incrementally according to errors of consistency between the actuator signals used to orient the cameras and those used to move the arm.

18 Claims, 7 Drawing Sheets

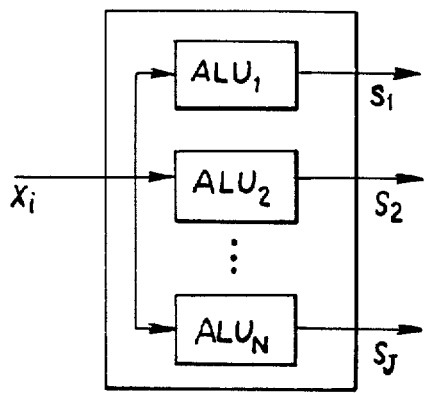 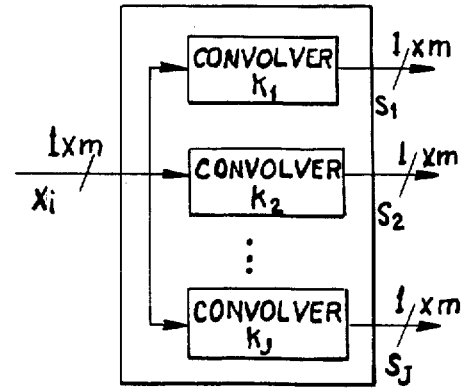
FIG.9　　　　　　　FIG.10
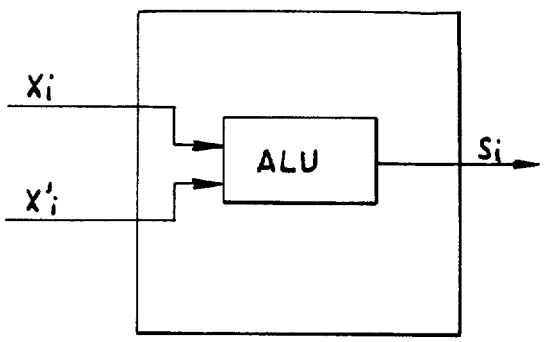
FIG.11

NEURAL NETWORK SYSTEM FOR ADAPTIVE SENSORY-MOTOR COORDINATION OF MULTIJOINT ROBOTS FOR SINGLE POSTURES

This work was performed under an NSF and Air Force grant DMC-852 1535.

BACKGROUND OF THE INVENTION

The present invention relates to a system and method for adaptive sensory-motor coordination in multijoint robots for single postures.

There is a need for the control of robots to be more flexible in real circumstances. Real environments are unpredictable and uncertain, real mechanical hardware wears out and real electronic components sometimes have noise and faults. More flexible robots should be able to integrate sensory and motor information in coordinated movements. They should also be noise and fault tolerant and self-organizing. One promising direction for achieving these properties is to borrow concepts from the brain, which has mastered very flexible sensory-motor coordination.

SUMMARY OF THE INVENTION

The object of the invention is to provide a novel approach to adaptive sensory-guided control of multijoint positioning. It is based on a new adaptive network control theory which greatly extends that disclosed in copending application, Ser. No. 001,223 filed Jan. 7, 1987. It allows a control system to learn a "sense of space" by its own experience. It uses both sensory and motor constraints to adapt to its mechanical system over time and maintain its adaptation to unforseen changes in the mechanics and sensory-motor calibrations.

This approach involves adaptive control principles, realized in neural-like parallel networks, that allow adaptation to many sets of kinematics. It is very fast because its architecture is massively parallel and its performance is feedforward.

In a preferred embodiment a solution is possible to the problem of adaptively positioning a two jointed arm to reach points in three dimensions that are within view of movable stereo cameras and within reach of the arm. This problem will be addressed under the conditions that the control system does not know a priori any of the following relationships accurately or reliably:

(1) The calibration of visual sensory geometry to arm movement.
(2) The relation between limb lengths and joint angles to end arm position.
(3) The calibration of actuator signals to joint angles.

In short, the control system does not have any a priori information about accurate sensory-motor relation or motor signal to posture relation.

The method has developed by analyzing how biological systems determine movement control. It contrasts with previous adaptive control methods in an important way: there are no objective coordinates. Instead, a manipulator is controlled using the consistency between the signals used to move it and the signals used to sense the movement. Thus, sensory-motor coordination is crucial in this approach to motor control. Targets are represented in an egocentric frame of reference. This novel representation obviates the need for an objective coordinate generator required with purely target frames of reference. It also allows feedforward performance. Generating calibrations in objective coordinates becomes very difficult in unforseen or moving environments.

Another major contrast from previous adaptive approaches is the reliance of the system on parallel processing instead of ingenious software. This system is tolerant to signal noise and processor faults. It is very fast due to its parallel organization and can respond to multijoint control in real time.

The invention can adapt to many sets of parameters that describe the sensory and motor plants as well as variabilities in the internal structure of the system architecture. The goal is to represent the final actuator activation that will position the end of a multijoint limb to a target that is registered on two cameras. Targets used by this system are defined as points of greatest light contrast in the visual space. Over performance trials, the system's accuracy in computing target position will improve through a simple learning rule.

The system is designed to be extended to any number of sensory-motor maps used to indicate the position of a target in space by an orienting motor plant for any number of joints.

For this system to be useful in control of actual limb movements, both pre- and post-processing are required. The present invention assumes that the two stereo cameras can be accurately oriented to the target or the location of a target on each camera can be determined. It also assumes that a target representation can be used as a source to dynamically control limb movement.

In another embodiment image processing is utilized to grasp an object oriented in space. Two cameras which act as eyes orient to a cylinder and register stereo views of light intensity from the cylinder. Topographic patterns of activity derived from the motor signals to the eye muscles and from visual signals are correlated with the motor signals to the grasping arm, via modifiable neural weights. These correlations occur over many grasping postures. After the correlations are learned, any cylinder that is seen by the two cameras free in space, triggers the camera-motor maps and the visual maps to activate the arm-muscle signals for the intended grasping posture of that object. Because the correlation formed in the weight distribution can distinguish the grasping posture of any spatially oriented cylinder apart from any other, it is said to represent spatial position and orientation.

In this approach, the processing of sensory signals does not serve to provide real world features of objects. Instead, the processing consists of neural neighborhood operations that generate a variety of different measures derived from a single topographic sensation. Initially, a pattern of stimuli, such as light, is detected by independent receptors. Measures of local context among the receptor signals can be generated by point-to-point or by oriented neighborhood operations. These operations can be cascaded by successive networks to generate many more different measures of sensation context, each one with a larger effective sensation area than the previous one. In this approach, any or all the networks of sensation measure can be used to correlate with motor signals. The amount of correlation may vary from measure to measure and those measures that correlate the most will be used to recognize the object the most. Of course, many different measures could have been used. Contrast orientation and visual disparity were chosen as the neighborhood operations in this model problem because they are likely to correlate well with grasping a cylinder in space.

BRIEF DESCRIPTION OF THE DRAWINGS

FIGS. 7-13 are block diagrams of an information processing system for the embodiment of FIG. 6.

DETAILED DESCRIPTION OF THE INVENTION

Figure 1:
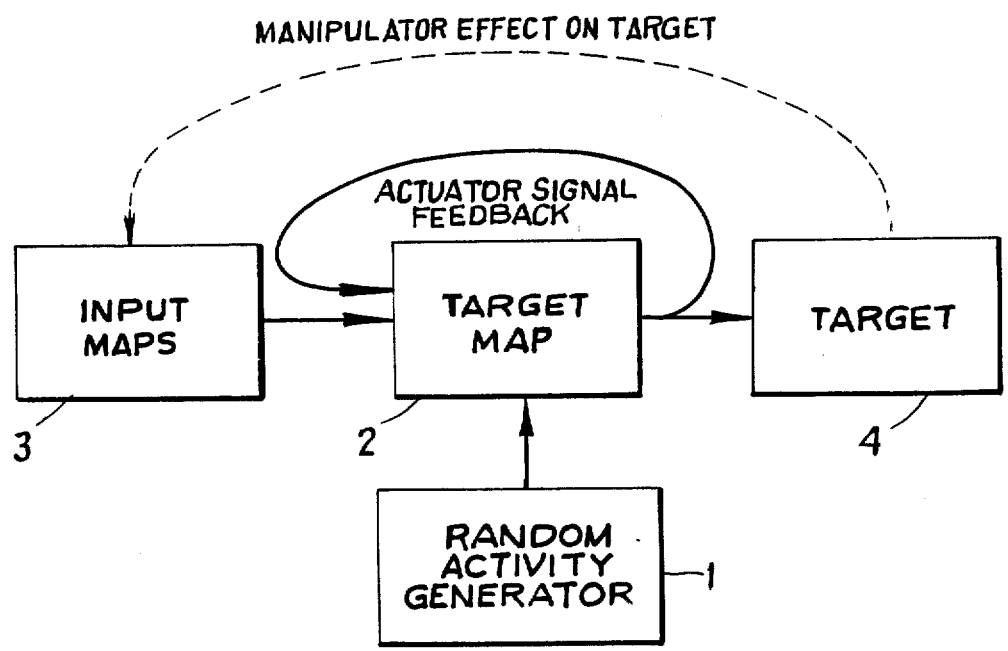
FIG. 1 is a block diagram of the sensory-motor circular reaction according to the invention.

The general strategy to accomplish this kind of flexibility is to use a sensory-motor circular reaction, shown in FIG. 1. In this reaction, a spatial representation is based on signals used to orient in that space and not by signals used to sense the space. First a random activity generator 1 activates a target map 2 which orients the limbs 4 into random positions. Then the position of the end of the limbs is visually sensed and registered on an input map 3. The input map's outputs are then correlated with whatever target map activity was used to initially orient the limbs. Correlation is preferably carried out by a computer and in particular a massively parallel processor such as a single instruction multiple data (SIMD) or a parallel pipeline processor. After the correlation is learned, any new random light target which triggers the input map, will correctly activate the target map to orient the limbs to that target. In a sense, when the system knows how to see where it moves, then it can move to where it sees.

Figure 2:
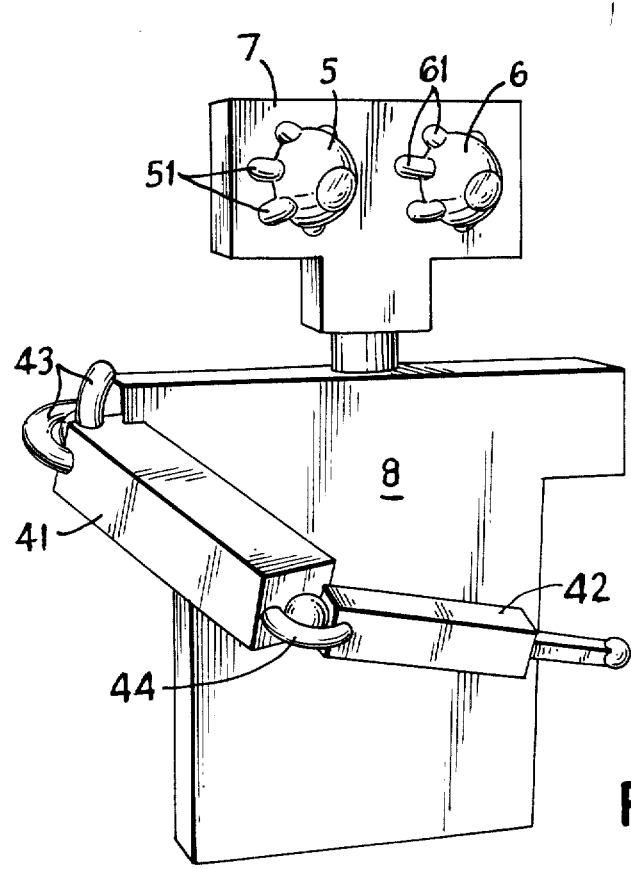
FIG. 2 is a robot according to the invention.

The model robot in FIG. 2, comprises two movable cameras 5, 6 attached to one block 7 and two coupled limbs 41, 42 attached to another block 8. The robot is made to look anthropamorphic, with two eyes and a two jointed arm. Actuators 51, 61, mounted to each camera provide rotation of each camera with two degrees of freedom. The limbs have three pair of antagonistic actuators; two pair 43 on the upper limb and the one pair 44 on the lower limb. These provide the upper limb 41 with rotation in two degrees of freedom and lower limb 42 with rotation in one degree of freedom. The range of each limb's orientation does not exceed a half circle arc.

Some functional constraints that the cameras and limbs have, on positioning the arm, help shape the way limb orientations will be represented.

The angle of camera orientation varies monotonically with the amount of activation of each actuator attached to it. Each camera points to a target (point of light contrast) so that the target is registered on the center of each camera image. As a target becomes more eccentric vertically or horizontally from straight ahead, the pitch and yaw angles of both cameras become monotonically more eccentric. As a target becomes nearer, the disparity between the two camera yaw angles becomes monotonically greater.

The controller is composed of a hierarchy of two dimensional arrays of processing elements. These arrays are called networks. Each processing element has an associated activity that is described by an analog amplitude. All networks are bilaterally symmetric in their organization. The activity of processing elements are affected by weighted inputs and the weights are changed by factors either internal or external to the network.

Targets (points of light contrast) and limb orientations are represented in these networks as follows.

First, the orientation of each camera to a target can be described completely by the amount of activation of the six actuators that position each camera. Thus, a target can be represented by the two distributions of actuator activities used to orient the two cameras to that target. These distributions are transformed so that a distribution of six amplitudes becomes a unimodal input distribution over many processing elements. These in turn, are fed into a network that becomes the target map.

The input distributions are peaked at locations in the target map so that there is one-to-one correspondence between the locus of peaks and camera orientations. This correspondence can be described as forming a topography across orientation space.

The unimodal input distributions from both camera orientations are combined by overlapping their inputs onto the target map. The first key aspect to this architecture is that the inputs gate the outputs. Specifically, the output from each target map element is proportional to its input. This isolates different pockets of target map processing elements to the degree that activity is isolated by the input distributions.

Figure 3:
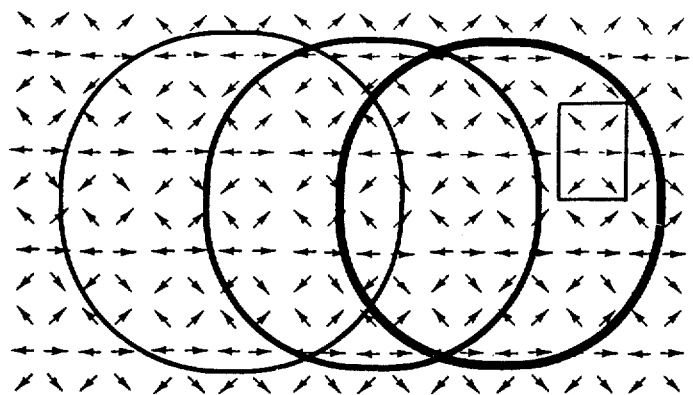
FIG. 3 is a diagram showing interleaving for a first embodiment, columnar architecture of the target map.

The second key ingredient to how the target map works, is the geometry of its outputs. The elements of the target map will output to networks that control limb actuators. These elements are arranged so that all the limb actuators they represent, are interleaved. A schematic of this arrangement is shown in FIG. 3. Thus, representations of all actuators are scattered through all areas of the target map. An area of the target map that contains a complete set of actuator representations is called a column (after "cortical columns" in the brain). The whole target map has many such columns. The distribution of amplitudes in every locally active column can crudely represent the limb positions needed to reach the target. Of course, this representation will need to be modified by orientation performance to calibrate itself, but the essential target representation can now be constructed.

It is very unlikely that the two input distributions combine linearly to achieve target position. But by using modifiable input weights, it becomes possible to generate the appropriate global nonlinearity that is required to accurately describe the relationships between all stereo camera angles used to point to targets and the arm joint angles used to get to targets. With different weights, each target map column locally contributes to limb-actuator activity slightly differently. The architecture is piece-wise linear but as a whole, nonlinear.

The elements of the target map get used to achieve the final target position as follows. This is determined by the collective outputs of all active columns. Each actuator representation in every column of the target map outputs respectively to a separate actuator network that corresponds to one of the six limb actuators. This disentangles the interleaved architecture of actuator representations in the target map. The mass convergence of outputs from the target map to the six actuator networks generates the global distribution of motor activity that represents the target position.

Because each actuator network in this final output stage receives an input from many columns, the total activity is relatively insensitive to signal noise, since this massive convergence averages out the noise.

The output of the system must then be further processed to control the dynamics of actuator activation. This can be done by a dynamic generator similar to the one used for eye movement generation in the copending (Grossberg and Kuperstein application Ser. No. 001,223). The present system yields the essential form of the input to such a generator, which is the distribution of actuator activity that represents the target position.

Learning is crucial to achieving and maintaining the accuracy of the target map. Successful representation of invariant target position depends on the right distribution of weight values for the inputs to the target map. The sensory-motor circular reaction is the guiding strategy for achieving calibration. First, random actuator values are generated to position the limbs to a random posture. The two cameras then point to the end of the arm. The camera actuator values used during their orientation become the source of inputs to the input map. The input map's outputs are multiplied by the current weight values which are both added to, and compared with respectively, current target map activities.

The addition of weighted input map values and current target map values are normalized by creating a ratio scale across agaonist and antagonist representations. The normalizing computation keeps the limbs at their existing posture whether the target map elements are activated by either the input map or the random activity generator alone or both together.

Determining which weights to change and by how much presents a potential problem. Since the input distributions are broad, the same weights are used for nearby camera orientations on different trials. Therefore, changing the weights corresponding to one set of camera orientations to improve the target position for one target, effects many other target positions used on later trials. In particular, there is no guarantee that improving the target representation from one combination of camera orientations will not hurt another combination. In view of the overlapping nature of the target map, it is necessary for the learning scheme to converge so that all combinations of retinal and eye positions will become accurate.

To deal with this problem it is important to minimize any negative impact of learning across combinations of different retinal and eye positions. To achieve this, the invention uses an incremental learning scheme. In this scheme, the weights of the current combination of camera orientation input to the target map are not modified to achieve perfect accuracy in one trial. Rather, they are modified to achieve accuracy a little at a time. The object is that, over many trials, all the incremental changes will accumulate to give the most parsimonious accuracy for all possible combinations. The size of an incremental weight change can be equally effective over a large range of values. All that is important is that the approximate direction of the incremental change be specified for all the actuator representations.

By following the circular reaction strategy of correlating camera orientations to limb orientations and by using incremental, shared learning, target positioning should improve. The learning rule is: any difference between the original values of the limb actuator activities and the accumulated weighted input map values will cause all the active weights to change by a small amount so as to decrease that difference. This will improve performance accuracy. Note that since all the active weights are changed during learning, they all share in their contributions to an accurate target position. Moreover, changing the total population in any network or allowing small amounts of element faults will not qualitatively change the results.

In one example, the system has been simulated to comparatively test same.

There are two aspects to the model simulations. One is the model itself and the other is an omnipotent observer that keeps track of the exact orientations of the cameras and limbs and positions of targets to that performance errors can be measured.

The model is tested of N trials. On trial n: n = 1,2, ... . N the amount of activation for the agonist actuators of the upper and lower limbs ($L_{1q}$; q = 1,2,3) are $$L_{1qn} = r_{qn} \text{ where r is random (0-1)} \tag{1}$$

The activation for the antagonist actuators ($L_{2q}$) are normalized so that $$L_{1q} + L_{2q} = 1. \tag{2}$$

For definiteness, the joint angle of the limbs are computed to be linearly proportional to actuator activation, in the angle range 0°-160°. Any one of a whole family of monotonic functions of actuator activity could have been chosen with similar results. Impossible limb positions, such as behind the camera, were discarded.

By knowing the joint angles, limb lengths and limb origins, the position of the end of the arm is determined using trigonometry (relative to an observer). Then the orientation of the two cameras is computed so that they point toward the end of the arm, which is the target.

The motor inputs in the model are represented by transforming the distributions of actuator activity for each camera, when each camera points to the end of the arm. The left and right motor inputs (camera orientations) are represented in matrices $C^1$ and $C^2$ which are called the input maps. Each of the six actuators pulls the camera in its own direction $\mu_{pq}$ defined by $$\mu_{pq} = (p-1)\pi + (k-1)\pi/3 \text{ for p} = 1,2 \text{ and for } q = 1,2,3 \tag{3}$$

Although, in this definition the pulling directions are equally spaced, the model does not require it.

For a camera pointing with a pitch p and a yaw y, the camera actuators have activities $$C_{pq} = a \, (\rho \cos(\theta - \mu_{pq}) + 1) \text{ for constant a} \tag{4}$$

$$\text{where } \rho = (p^2 + y^2)^{\frac{1}{2}} \tag{5}$$

$$\text{and } \theta = \tan^{-1}(p/y) \tag{6}$$

$\rho$ has a range 0-1 and a is chosen to be 0.5, so that $C_{pq}$ has a range 0-1.

A whole family of functions can be used that would have similar results. These functions have the following three properties: (a) The range of activity is always positive. (b) The combined lengths of agonist-antagonist actuator pairs are preserved. (c) The magnitude of the function increases as the camera is moved from a direction that is most opposite to most parallel to the intrinsic direction of the actuator.

The two camera actuator activities are transformed into two unimodal distributions of activity whose peaks are centered at locations in the matrices $C^l$ and $C^r$ corresponding to the polar coordinates $(\rho^l n, \theta^l n)$ and $(\rho^r n,$ and $(\rho^r n, \theta^r n)$. All the networks discussed in this section (except where noted) are composed of two dimensional matrices indexed by i,j and range for 1 to I and J, respectively. Both I and J are usually 20. For ease of computation without formally changing the model, radii are mapped along one dimension of the matrices and angles are mapped along other dimension. Each input map is composed of bilaterally symmetric hemifields. The right hemifield represents angles 0° to 180° and the left hemifield represents angles 0° to $-180°$. Radii range from 0–1.

Any one of a large family of unimodal distributions can be chosen for the actuator transformations without affecting the results. The main criteria for these distributions are that 1) the loci of distribution peaks has a one-to-one correspondence to the loci of camera orientations and 2) the loci of peaks are ordered. Distributions which are too narrow or broad will not work.

One function which satisfies these constraints that has been used is a gaussian function whose peak location corresponds to the where the the camera is oriented in its visual field. This is the one used for FIG. 4.

Figure 4:
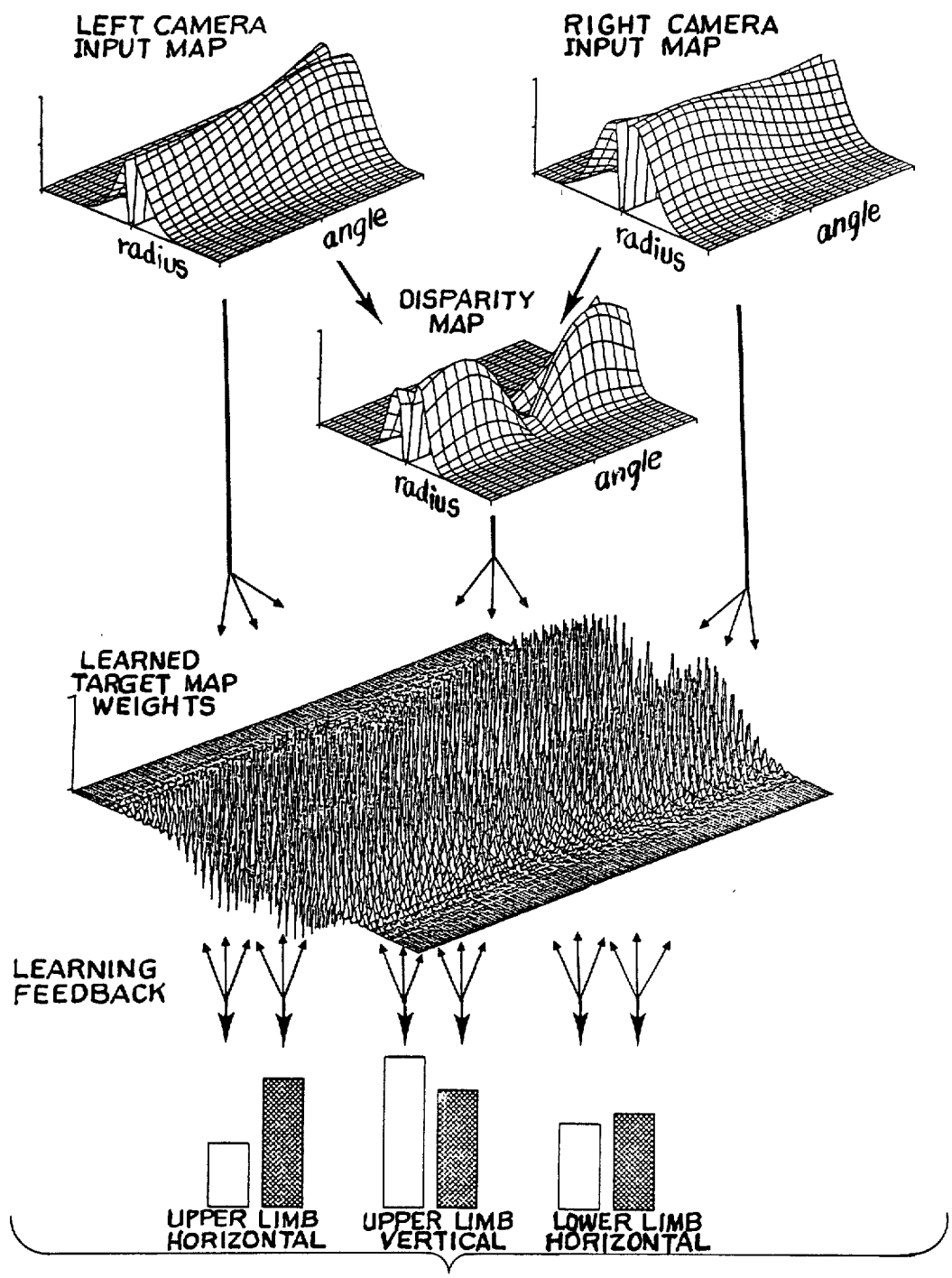
FIG. 4 shows the maps according to the invention for one trial.

FIG. 4 shows the activity distributions in the model for one trial. Information from the registration of camera orientations is transformed into unimodal, topographic distributions for the input maps. These maps, shown on top, are divided into bilateral hemifields. For computing the depth of the target, a map is formed that represents the disparity of orientation between the stereo cameras. Then the input maps' outputs are multiplied by a learned distribution of weights at the target map and finally converges to the three limb-actuator maps. They are also used to provide feedback for learning. The final maps are used to position the end of the two-jointed arm to the target. Values are in relative units.

Another function is one that mimics realistic neural responses. It is called the "recruitment" function because it recruits increasingly more elements with increasing input amplitude. This is the similar to the Position-Threshold-Slope Map in U.S. Patent Application Ser. No. 001,223 Once nice feature of this function is that it only requires arithmetic operations on each element to directly transform the camera actuator activities $C_{pq}$ into the input map $C_{ij}$. Then $$C_{ij} = [\Sigma_{pq}(c_{pq} P_{pq}(ij)) - \pi(i)]^+ \qquad (7)$$

for $i = 1,2 \ldots I$ and $j = 1,2 \ldots J$ and where the operation $$[\omega]^+ = \begin{cases} \omega & \text{if } \omega > 0 \\ 0 & \text{if } \omega \leq 0 \end{cases} \qquad (8)$$

$$P_{pq}(i,j) = (i/I \cos(j/J\pi - \mu_{pq}))/2 + 1/2$$

$$\Gamma(i) = .8 \, (i/I)^2 \qquad (9)$$

In order to make use of stereo information, the left and right camera input map activities are brought together to form a disparity map. This map should have the following properties: (1) it describes a measure of disparity between camera orientations; (2) it has a topography across orientation space just as the inputs maps do; (3) the computation should not depend on which of the two camera orientation is larger (summetry) and (4) both cameras must be active for the disparity to computed (binocularity). These properties are similar to those seen in the visual cortex of the brain for disparity of visual contrasts.

On function that satisfies these constraints for the disparity map is $$C^d_{ij} = b \, C^l_{ij} C^r_{ij} | C^l_{ij} - C^r_{ij} | \qquad (10)$$

where b is a constant. Dependence on ij give the topography property; the multiplication gives the binocularity property; the absolute value gives the symmetry property and the difference gives the disparity property.

All three camera input maps send signals to a target map, composed of matricies $T^l$, $T^r$ and $T^d$, in a one-to-one fashion. The superscripts l,r and d stand for left, right and display inputs. The target map is made of interleaving elements that represent the actuators in the two limbs. The interleaving arrangement will be noted by the expression i,j $<pq>$ which means target map position i,j composed of a distribution of q pairs (p=1,2) of limb-actuator elements.

The target map is defined in three parts by $$T_{lij}<pq> = [C^l_{ij} W^l_{ij} <pq>]^+ \qquad (11)$$

$$T_{rij}<pq> = [C^r_{ij} W^r_{ij} <pq>]^{30} \qquad (12)$$

$$T_{dij}<pq> = [C^d_{ij} W^d_{ij} <pq>]^+ \qquad (13)$$

where the W's are the modifiable input weights.

The target map equations say that all the input elements are gated by weights in the interleaved architecture of the target map. Thus each input has access to all limb-actuator representations. Note that weight values (W's) can be negative. Negative weights mean learned inhibition. All weight distributions are initialized to 0.

The outputs of the target map project to separate actuator outputs.

$$a_{pq} = \Sigma_{ij}(T_{lij}<pq> + T_{rij}<pq> + T_{dij}<pq>) \qquad (14)$$

In essence, the outputs from the target map tease out the separate actuator representations from all the target map position and aggregate them into their respective output maps.

These activities are then normalized across antagonistic actuator pair representations along with the initial values (e.g. 1,2):

$$L_{1q} = (a_{1q} + r_{1q})/(a_{1q} + a_{2q} + r_{1q} + (1 - r_{1q})) \qquad (15)$$

$$L_{2q} = (a_{2q} + 1 - r_{1q})/(a_{1q} + a_{2q} + r_{1q} + (1 - r_{1q})) \qquad (16)$$

for q=1,2,3.

The model improves its performance by modifying the input weights, W's. According to the circular reaction strategy, the outputs of the target map (e.g. 18) are correlated with the initial activity that positions the limbs, (e.g. 1,2). This correlation occurs by minimizing the difference between these two signals. Thus, the differences or errors are $$e_{pq} = r_{pq} - a_{pq}. \tag{17}$$

When these differences occur, the model has no easy way of assessing which of the many weights used to generate the $a_{pq}$ activities are more responsible than others for performance errors. The simplest remedy is to change all active weights equal by a small amount. This rule forms the concept of shared incremental learning.

$$W^l(n-1)_{ij} <pq> = W^l(n)_{ij} <pq> + \sigma C^l_{ij} e_{pq} \tag{18}$$

$$W^r(n+1)_{ij} <pq> = W^r(n)_{ij} <pq> + \sigma C^r_{ij} e_{pq} \tag{29}$$

$$W^d(n-1)_{ij} <pq> = W^d(n)_{ij} <pq> + \sigma C^d_{ij} e_{pq} \tag{20}$$

where $\sigma$ is the learning rate.

The learning rule states that the weights of those sensory inputs that are active are changed by a increment that depends on the component of an error in the respective muscle direction. This component specific learning occurs in interleaved columnar architecture of the target map.

Because of the incremental learning rule, the values of $a_{pq}$ are approximately proportional to the values of $r_{pq}$. Thus, the values of the actuator activities $L_{pq}$ are approximately the same whether or not the $a_{pq}$ values are added to $L_{pq}$. That means equation 1 and 2 are approximately equal to equations 15 and 16. This is an important property because it is undesirable for the initial posture of the limbs (eq. 1,2) to change when the target map is active (eq. 14,16) and sampling that posture.

After learning for trial n, the next trial continues with the choice of the next random activation of the limb actuators.

When learning has converged, trials can continue in a phase of limb orientation. According to the circular reaction strategy, a spot of light contrast can substitute for the end of the arm as a target. In this condition the random activity generator is off but target map is active. In other words, the arm may be away from the light target while the cameras are actively pointing to the light target. In this condition, the values for $L_{pq}$ would be $$L_{1q} = a_{1q}/(a_{1q} + a_{2q}) \tag{21}$$

$$L_{2q} = a_{2q}/(a_{1q} + a_{2q}) \tag{22}$$

for q=1,2,3.

When these values are used to control the orientation of the limbs, the end of the arm will reach the light target, because the target map has developed a correlation to the limb-actuator representations. This means that after learning converges, equations 1,2; 15,16; and 21,22 are approximately equal. How accurately the arm's position reaches the target will depend on how well the target map weights allow the input map signals to be correlated with the limb-actuator representations.

The real accuracy of the model is determined by computing spatial-error vectors in three dimensions for a sampling of targets in space.

FIG. 4 shows the activity distributions in the model for one trial. The figure shows the flow of information from camera-orientation inputs to limb actuator outputs. The camera orientations evoke activity in the input camera and disparity maps which converge onto the target map and finally the target map outputs the intended activation of limb actuators that orient the limb to the target. All the maps are in conformal logarithmic forms for computational convenience. The polar maps are shown with radii in the x-axis and angles in the y-axis. This form has no effect on the results.

The converge and accuracy of the model is determined by observing the average performance error over many trials. Performance errors are shown by the average differences between target map outputs and randomly generated limb activations (eq. 21) as a percent of the signal range.

Figure 5:
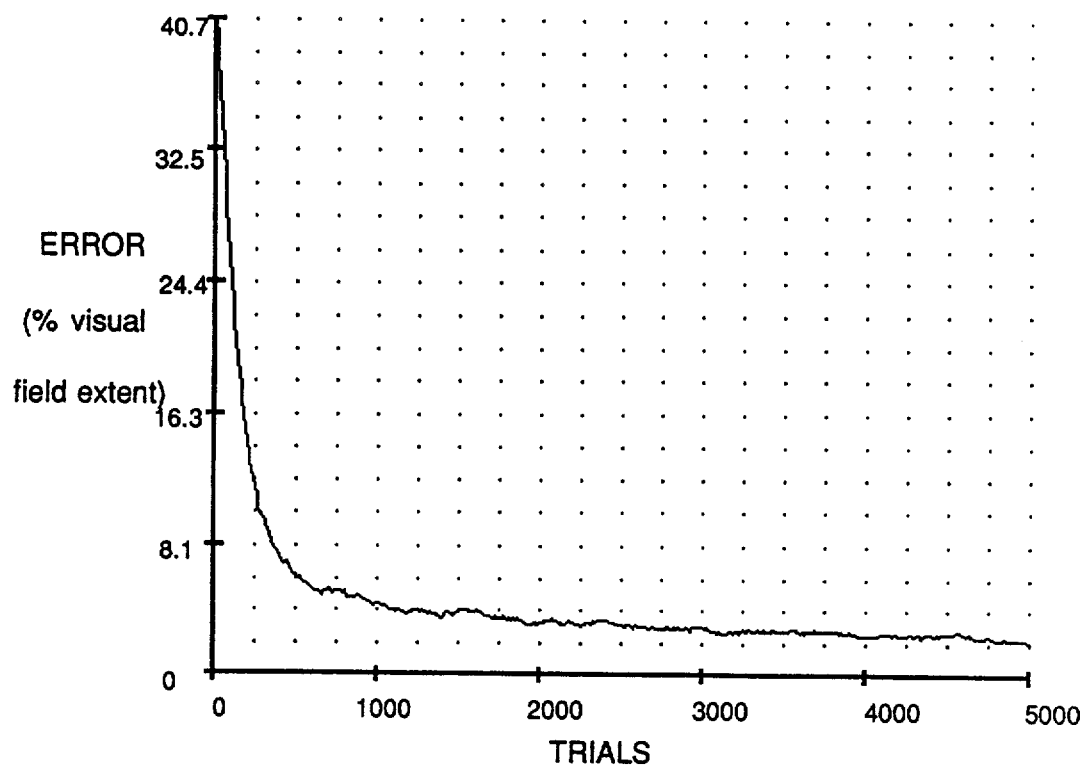
FIG. 5 shows a graph of the reduction in average position errors as a function of trials.

FIG. 5 shows the average errors plotted over many trials. The computer simulations converged to asymptote with an average error of 4.3% of the intended limb-actuator activation. For the first 300 trials there was a very rapid convergence rate and thereafter, there was slow convergence rate. The simulations converged after about 5000 trials.

The essential measure of the system stability comes by observing the convergence. If a simulation does not converge well under certain parameters, the reason can often be gained by looking at the values and shapes of the distributions for final inputs weights to the target map. In this way, the role of a number of parameters can be described empirically. The following parameters were analyzed: (1) the shape, (2) width and (3) scaling of the input map distributions; and (4) the rate of learning. Because of the long time needed to run through each simulation, only a few samples of different parameters were chosen to gain some qualitative insight about the parameter ranges.

Unimodal distributions of different widths and scales were used to represent camera orientations. There is an optimal width for these distributions which are governed by the following rules. The width of the distribution for the most extreme camera orientation should be wide enough to reach the network limits. This constraint makes most use of the network space. The width of the distributions for all camera orientations should be wide enough to allow overlap for pair combinations of stereo orientations. This allows good disparity measures for depth computations. Moreover, the width of the distributions should be narrow enough to allow sufficient distinctions between their peaks. Otherwise the pockets of weight changes in the target network will not have sufficient dynamic range.

From qualitative observations, deviations from the nominal distribution widths are roughly proportional to increases in performance errors. However, the model is relatively insensitive to the shape of the unimodal distributions. For example, gaussian, pyramid and exponential distributions also work well.

The learning rate constant has an effect on how fast the system converges to an asymptote. With a constant of 0.001 ($\sigma$ in eq. 18–20), most simulations converged in 5000 trials. With a constant of 0.0001, the system converged slower. Increasing the learning rate constant only improves convergence up to a point. If the rate is too big, the system diverges. This is due to the overlapping nature of the target map. Large improvements that are mode to one combination of camera orientation inputs, in one trial, can seriously disrupt the accuracy of neighboring input weights on successive trials. The reason is that the changes made to the weights on one trial are linear, whereas the gradient of final weight values are nonlinear. Thus improvements in the consequences across the whole map.

Figure 6:
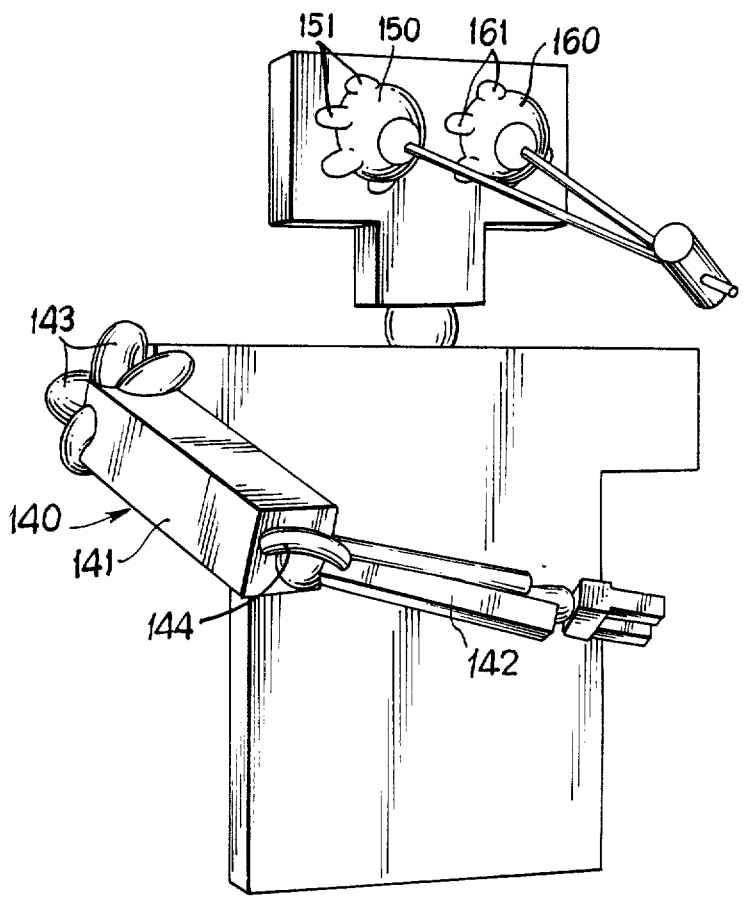
FIG. 6 is a robot according to the invention for use in seeing and grasping.

The embodiment of FIG. 6 is directed to the use of image processing in addition to adaptive motor coordination. The system of FIGS. 7-13 involves the same circular reaction as the embodiment of FIGS. 1-5, however initially the robot holds the cylinder when in random postures of the arm and the robot eyes correlate how the robot moves.

In the system self-produced movement signals that manipulate objects are correlated with object sensory signals so that in the future, object sensory signals alone can evoke the associated movement signals. With this reaction, object recognition is defined as the potential for appropriate object manipulation.

In FIG. 6, each of two eyes 150, 160 moves in a pitch and yaw direction controlled by six muscles 151, 161 that pull in directions spaced 60° apart. Each eye senses a 50×50 matrix of binary visual intensity. The arm 140 moves in five degrees of freedom controlled by five pair of antagonistic muscles 141-145. The shoulder joint 146 moves in pitch, yaw and roll and the elbow joint 147 moves in yaw and roll.

The neural model in a typical learning trial is similar to that shown in FIG. 5. During learning, the random generator produces arm-muscle signals (bottom-center) for a random arm grasping posture of a cylinder. Then the two eyes orient to the cylinder. The direction and relative extent of the eye-muscle signals which determine eye gaze is shown at the top-left. Each eye-muscle signal (six per eye) is transformed into a topographic distribution via a recruitment function. Then corresponding distributions in the same pulling direction from each eye are combined to form a third distribution via a disparity function. These three eye-muscle signal transformations for one trial are interleaved in the eye map (top six-legged graph). Each leg of the graph represents the pulling direction on either eye. The amplitude of the three-eye-muscle distributions (left-eye, right-eye and disparity) are shown along the graph radii. The weight distributions for the eye map are shown as the bottom six-legged graph. It contains weights that gate signals from each eye map unit to each arm-muscle unit. A similar series of transformations occur for visual signals. First, stereo views of the grasped cylinder are registered (top-right). In each trial, these images are processed for contrast orientation and visual disparity. The network graph on the top-right shows interleaved orientation and disparity responses from both eyes. The weight distributions for the visual map are shown at the middle-right. It contains weights that gate signals from each visual map unit to each arm-muscle unit. (Only a sampling of the 300,000 values for the visual weights are shown for clarity.) Arm-muscle signals produced by both the eye map and visual map are compared against arm-muscle signals produced by the random generator. The differences are used to change values in the two weight maps so that on future trials the differences will be minimized.

In the system of FIG. 6, self-produced movement signals are first used to generate the entire range of object manipulations one at a time. During each motor posture, with object in hand, topographic sensory information about the object projects to a target map through modifiable gating factors, called weights, to produce computed motor signals. Errors in the target representation are determined by the differences between the actual motor signals for each posture and the computed motor signals. These errors are used to incrementally change the weights, so that on future trials, the computed motor signals are closer to the actual motor signals These changes, for all possible motor postures, constitute the sensory-motor correlation.

When the correlation is good, it can be used to accurately recognize and manipulate similar objects. Suppose an object came within view and reach, free in space, after learning. Sensory information about the object projects to a target map through the correlated weights to produce the appropriate motor signals to manipulate the object, apart from other appearances of the same object and apart from other objects. From this point view, the representation of the intended specific manipulation of an object becomes the perceptual recognition for that object.

In the embodiment shown in FIG. 6, the object is a cylinder C oriented in space. The two eyes orient to the cylinder and register stereo views of light intensity from the cylinder. Topographic patterns of activity derived from the motor signals to the eye muscles and from visual signals are correlated with the motor signals to the grasping arm, via modifiable neural weights. These correlations occur over many grasping postures. After the correlations are learned, any cylinder that is seen by the two eyes free in space, triggers the eye-motor maps and the visual maps to activate the arm-muscle signals for the intended grasping posture of that object. Because the correlation formed in the weight distribution can distinguish the grasping posture of any spatially oriented cylinder apart from any other, it is said to represent spatial position and orientation.

In this approach, the processing of sensory signals does not serve to provide real world features of objects. Instead, the processing consists of neural neighborhood operations that generate a variety of different measures derived from a single topographical sensation. Initially, a pattern of stimuli, such as light, is detected by independent receptors. Measures of local context among the receptor signals can be generated by point-to-point or by oriented neighborhood operations. These operations can be cascaded by successive networks to generate many more different measures of sensation context, each one with a larger effective sensation area than the previous one. In this approach, any or all the networks of sensation measure can be used to correlate with motor signals. The amount of correlation may vary from measure to measure and those measures that correlate the most will be used to recognize the object the most. Of course, many different measures could have been used. Contrast orientation and visual disparity were chosen as the neighborhood operations in this model problem because they are likely to correlate well with grasping a cylinder in space.

There are two aspects to the processing. One is the neural model and the other is the simulation of the postures of the eyes and arm and the images that the eyes receive. The neural network has no apriori knowledge of kinematics of the physical plant. Seeing and grasping is simulated as a human-like cartoon on a graphics processor with two eyes and an arm (FIG. 2). The two fingered gripper is controlled outside the scope of the present neural network.

The arm-muscle signals, $a_{pq}$, activate antagonistic muscle pairs in five degrees of freedom (p=1,2; q=1,2...5) for the upper and lower limbs. q=1 is shoulder roll, q=2 is shoulder pitch, q=3 is shoulder yaw, q=4 is elbow roll, q=5 is elbow yaw.

The eye-muscle signals, $e_{pq}$, activate three pairs of antagonistic muscles for each eye (p=1,2; q=1,2,3).

Each eye also registers a visual field $V_{ij}$ of light intensity, $i=1,2...I$, $j=1,2...J$.

The network operates over N learning trials. FIG. 3 shows the neural networks for one typical trial. On trial n: n=1,2, ... N the arm-muscles signals are first randomly generated and normalized:

$$a_{pqn} = A_{pq}/(A_{1q}+A_{2q}) \text{ for } p=1,2;q=1,2,...5 \quad (101)$$

$$\text{where } A_{1qn} = \text{random } (0-1) \quad (102)$$

$$\text{and } A_{1q}+A_{2q}=\alpha; \text{ for constant } \alpha \quad (103)$$

For definiteness the joint angle of the limbs are computed to be linearly proportional to muscle activation. Any one of a whole family of monotonic functions of arm-muscle signals can be chosen with similar results.

Activation of the arm muscles leads to an arm posture while a two fingered gripper holds a cylinder. Then using trigonometry (for purposes of kinematic simulation only), the orientations of the two eyes are computed so that they point toward the visual center of the cylinder target. The eye-muscle signals that determine the eye orientations are then used as input to the network. The set of eye-muscle signals is computed from the eye orientations.

Note that this nonadaptive inverse computation for eye-muscle signals can be substituted by an adaptive feedforward neural model used to control eye origination without changing the present model.

After the eyes are oriented to the cylinder target, each eye-muscle signal is then transformed into unimodal distributions of activity $E^1_{pq}$(left) and $E^r_{pq}$(right). Each distribution creates a topography for each eye-muscle signal. Any one of a large family of unimodal transformations can be chosen without affecting the results. The main criteria for these transformation are that (1) the loci of distribution peaks has a one-to-one correspondence to the loci of eye orientations and (2) the loci of peaks are ordered.

For the current mode a unimodal transformation was chosen that mimics realistic neural responses. It is called the "recruitment" function because it recruits increasingly more neural elements with increasing muscle signal amplitude. One nice feature of this function is that it only uses simple operations on each element to directly transform the eye-muscle signals $e_{pq}$ into the distribution $E_{pq}$.

$$E_{pqi} = [e_{pq}-r(i)]^+ \psi(i) \quad (104)$$

$$\text{where } [\omega]^+ = \max(0,\omega) \text{ and} \quad (105)$$

$$r,(i) = a \cdot i/I; \psi(i) = b \cdot i/I; \quad (106)$$

$i=1,2,...I$; a,b are constants.

Data on the activity of motor neurons suggest that this type of function might exist in the brain. Populations of neurons in the abducens and oculomotor nuclei have response characteristics in which the thresholds and slopes of activation convary as a function of eye position (muscle contraction).

In order to make use of stereo information, the left and right eye-muscle distributions $E^1_{pq}$ and $E^r_{pq}$ are brought together to form a topographic disparity distribution $E^d_{pq}$. This distribution has the following properties: (1) it describes a measure of disparity between eye orientations; (2) it has a topography across orientation space; (3) the computation does not depend on which of the two eye orientation is larger (symmetry) and (4) both eyes must be active for the disparity to be computer (binocularity).

One function that satisfies these constraints for the disparity distribution is $$E^d_{pqi} = d \cdot E^1_{pqi} D^r_{pqi} | E^1_{pqi} - E^r_{pqi}| \quad 107)$$

where d is a constant and $i=1,2,...I$ (network population). Dependence on i gives the topography property; the multiplication gives the binocularity property; the absolute value gives the symmetry property and the difference gives the disparity property. The distributions $E^1$, $D^r$ and $E^d$ all together form the eye input map.

Each eye receives a 2-D visual projection of the spatial cylinder target, called a visual receptor map. These receptor maps, which are composed of binary light intensity distributions, are processed for graded orientation responses in four directions: 0°, 45°, 90°, 135° and then for binocular disparity. Thus each visual receptor map is processed into four topographic orientation distributions for each eye and four disparity distributions: $V^1_p$ (left), $V^r_p$ (right) and $V^d_p$ (disparity) where p=1,2,3,4.

The orientation distributions are achieved by summing neighboring values in the receptor maps along one of the four directions In effect, the receptor maps are convolved with a kernel matrix that has coefficients =0 everywhere except along one string in one of the four orientations. The coefficients in that string are all the same positive number.

This type of response mimics the orientation responses of visual cortex neurons to visual contrast Using a disparity computation similar to one for eye-muscle disparity, the visual disparity distributions $V^d_p$, p=1,2,3,4 are formed by combining pairs of corresponding orientation distributions using $$V^d_{pij} = h \cdot V^1_{pij} V^r_{pij}, |V^1_{pij}-V^r_{pij}| \quad (108)$$

where h is a constant.

This response is similar to the disparity responses of binocular neurons in the visual cortex.

When all these distributions are interleaved they form the visual input map, which mimics the retinally topographic layout of some of the neural responses observed in the visual cortex.

Next, the eye map and the visual map combine to produce arm-muscle signals through their respective target-weights. The modifiable target-weights act as gating factors between sensation and manipulation. They are changed by a learning rule, during each trial, to develop the correlation between topographic sensory signals and topographic motor signals across all trials. In doing so, they allow the spatial orientation of objects to be recognized by way of determining the correct arm-muscle activities used to grasp the objects.

The target-weight maps are made of interleaving elements that represent the five muscle pairs in the two limbs. The interleaving arrangement is noted by the expressed i,j<pq> which means map position i,j composed of a distribution of limb-muscle elements p,q (p=1,2;q=1,2 ... 5).

The product of the input maps and the target-weight maps converge to separate arm-muscle outputs $$A'_{pq} = \Sigma_{ijpq}(I_{ij}W_{ij}<pq>) \quad (109)$$

where $I_{ij}$ is every input element from both the eye map and the visual map and the W's are the modifiable target-weights. In essence, each input element is connected to each limb-muscle representation via a modifiable weight element. Note that weight values (W's) can be negative. All weight distributions are initialized to 0.

These motor signals are then normalized across antagonistic muscle pair representations along with the initial random values (see eq. 101);

$$a_{pq} = (A_{pq} + A'_{pq})/(A_{1q} + A_{2q} + A'_{1q} + A'_{2q}); \text{ for } p=1,2; \text{ for } p=1,2,\ldots 5 \quad (110)$$

The model improves its performance by modifying the target weights, W's. According to the circular reaction strategy, the outputs of the target-weight map (equation 9) are correlated with the initial signals that positions the limbs, (equations 101-3). This correlation occurs by minimizing the difference between these two signals. Thus, the difference or errors are $$\delta_{pq} = A_{pq} - A'_{pq}; \text{ for } p=1,2,\ldots \quad (111)$$

When these differences occur, the model changes all active weights by a small amount. This rule forms the concept of shared incremental learning $$W_{(n+1)ij<pq>} = W_{(n)ij<pq>} + \sigma I_{ij<pq>} \quad (112)$$

where n is the trail number and is the learning rate.

The learning rule states that the target-weights corresponding to those sensory inputs that are active, are changed by an increment that depends on the component of an error in the respective muscle direction. This component specific learning occurs back in the target-weight map.

Because of the incremental learning rule, the values of $A'_{pq}$ become closer to the random values of $A_{pq}$ in successive trials.

When learning converges ($\epsilon_{pq}$ is minimized), the system can recognize and accurately reach cylinders, free in space, within reach and sight. According to the circular reaction strategy, the eyes first orient toward the cylinder target. It will be sensed by the input maps which will in turn generate motor signals through the accumulated target-weights. In this condition the random signal generator is off ($A_{pq}=0$). The values for the arm-muscles signals would be $$a_{pq} = A'_{pq}/(A'_{1q} + A'_{2q}) \text{ for } p=1,2; q=1,2,\ldots 5 \quad (113)$$

When these values are used to control arm posture, the end of the arm will reach the cylinder target, because the target-weight map has already developed a correlation between the input maps and the arm-muscle signals. This means that after learning converges, equations 101, 110 and 113 are approximately equal for respective arm postures, due to the ratio normalization. As a result, exploratory performance alone (equation 101), exploratory performance with learning (equation 110) and learned performance alone (equations 113) generate similar arm reaches $A_{pg}$. How accurately the arm's position reaches the target will depend on how well the target map weights allow the input maps signals to be correlated with the arm-muscle signals.

The accuracy of the model's performance, outside the neural network, is determined by computing the difference between where the target is and where the arm ends up in cartesian coordinates. (This measure of error is not known to the network).

The present invention also includes an information processing system that controls adaptive sensory-motor coordination for single postures. In general it operates in two phases. In the first phase, sensory-motor relations are learned via correlations between input and output signals. In the second phase, the system uses the learned correlations to evoke the correct posture that manipulates a sensed object.

Figure 7:
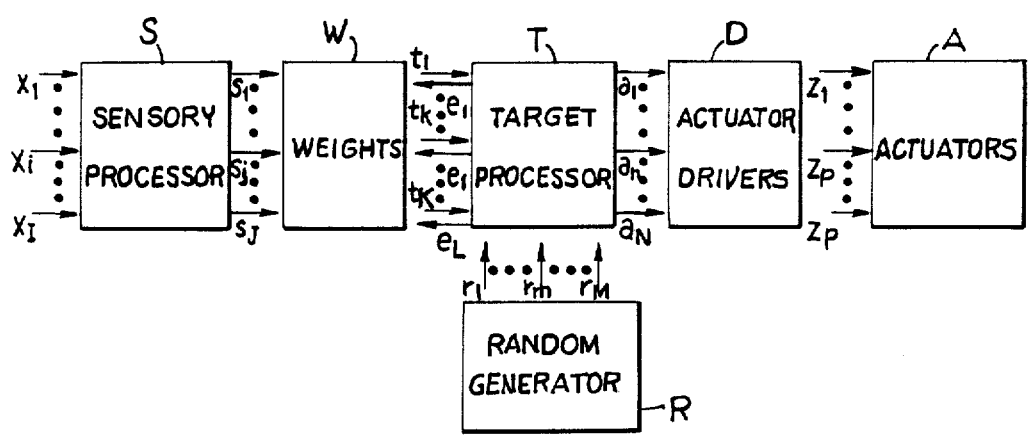

The block diagram in FIG. 7 shows the major modules of the apparatus that embody the method of this invention. One or more objects are sensed by some sensory transducers that produce signals x. The set of input signals x are topographic. This means that they are contiguously ordered with respect to some surface. In this case, the topographic surface is the surface that contains the sensory transducers.

The sensory processor module processes the input signals x into the signals s in some fixed way (examples shown below). The signals s are modulated by a set of weight signals w to produce local target signals t. A target processor module combines all the local target signals t and random signals r to produce global target signals a, which are used to move actuators through actuator drivers by signals z. The target processor also combines the random signals r with local target signals t to produce local error signals e that modulate the weight signals. The weight signals are modulated to improved the correlation between input and output signals. Changing the weights constitutes the method of learning in this apparatus.

Figure 8:
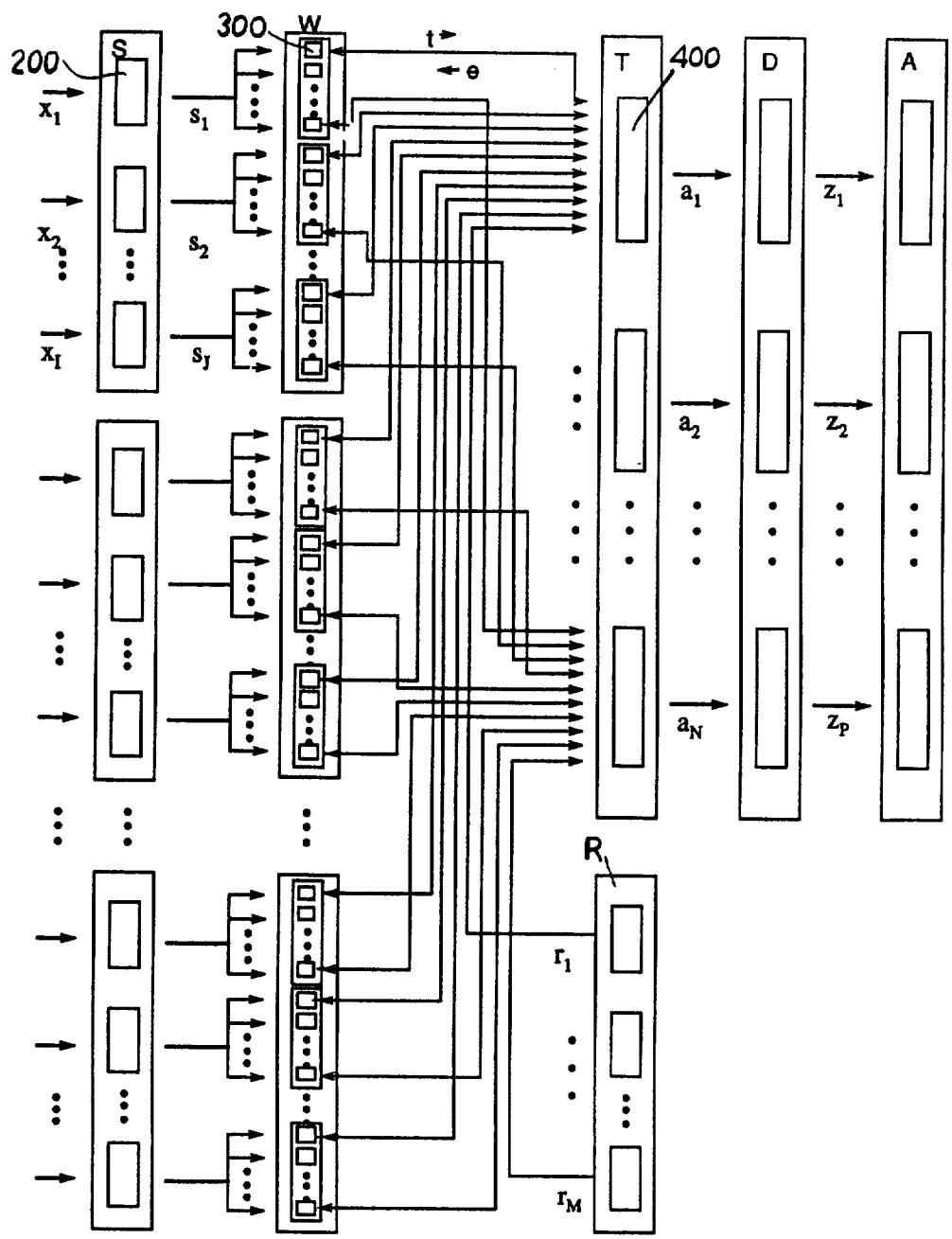

The geometry of the signal connections for the apparatus in FIG. 7 are shown in FIG. 8 FIG. 8 shows that any number of topographic input signals in any number of sensory processors can be combined by the apparatus to enable adaptive coordination with any number of actuators. All the connections form topographic mappings. This means that the connections preserve the ordered geometry of the inputs or the ordered geometry of the outputs. In FIG. 8, connections from S to W preserve the ordered geometry of the inputs while connections from W to T preserve the ordered geometry of the outputs.

Every sensory signal s, connects with at least as many weights as the number (P) of actuators. And every target module produces at least as many local error signals e as the number of local target signals t. Each random generator produces one signal for each actuator.

Example implementations of the sensory processor modules (label 200) are shown in FIGS. 9-11.

The recruitment response module (FIG. 9) transforms a single signal x to a monophasic distribution of topographic signals s. The locus of the peak amplitude in the distribution s shifts monotonically with respect to the amplitude of signal x. The equation for FIG. 9 shows that this transformation can be achieved by arithmetic logic units (ALUs) that operate with slope and threshold values which increase monotonically with respect to the ALU index. The equation for FIG. 9 is the general formulation of equations 104–105. The recruitment response module is especially applicable when using an actuator signal as a sensory input to the apparatus.

The contrast orientation module (FIG. 10) transforms an array of 1 by m elements in input matrix x to a distribution of matrices s by convolving the input matrix x with a kernel matrix k (see equation for FIG. 10). By this operation each matrix s represents a graded orientation response to contrasts of neighboring amplitudes in matrix x. The contrast orientation module is especially applicable when using video frame buffer signal as sensory input to the apparatus.

The stereo disparity module (FIG. 11) generates a measure of difference between stereo sensory inputs x and x'. This difference s requires both inputs to be active and does not distinguish which is larger. The equation for FIG. 11 is the general formulation of equations 106 and 107. The stereo disparity module is especially applicable when 3 dimensional coordination is being controlled by stereo transducers such as two video cameras.

Figure 12:
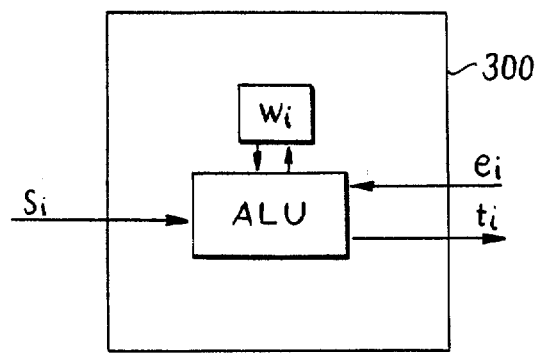

The weight processor module (FIG. 12) (label 300) has two roles. One is to map a local sensory signal to a local motor signal. This is done by gating the sensory signal s by a weight signal w. resulting in motor signal t. The other role is to control the learning of sensory-motor correlations by changing the weights w. This is done by modulating the weight w by an amount proportional to sensory signal s and error signal e. The equations in FIG. 12 are a general formulation of the summand in equation 108 and equation 111.

Figure 13:
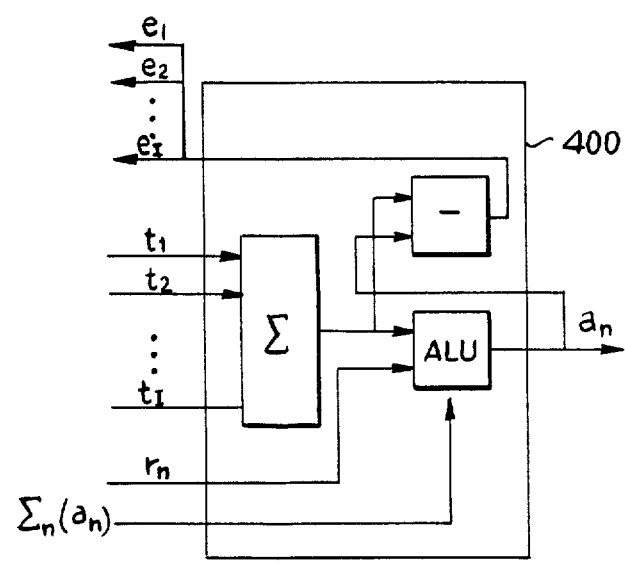

The target processor module (FIG. 13) (label 400) also has two roles. One is to combine all the local target signals t and random signal r into a global target signal a which is used to move an actuator via an actuator driver. The other role is to produce a global error signal that is determined by the difference between the actual target signal a and the computed target signal (sum of local target signals t). The global error is locally distributed back to the weight processor module via the error signal e. The equation in FIG. 13 are a general formulation of equations 108–110.

Computer simulations show that, throughout the continuous volume of the available grasping space, the model performs with an average spatial position error of 4% of the length of the arm and an average spatial orientation error of 4°. Learning asymptote is reached in about 3000–5000 trials.

The model will adapt to changes in a number of parameters with similar performance accuracy. These parameters include length of the arm links, distance between the eyes, displacement of the arm relative to the eyes, muscle response characteristics, optics of the eyes, and partial damage to the network.

The method and apparatus described herein enables any number of topographic sensory surfaces, each with any number of sensory transducers to be adaptively coordinated with any number of actuators for single postures. It is adaptive in the sense that it learns and maintains calibrated sensory-motor relations without operator supervision. The sensory-motor relations are defined as mappings from states of the set of sensory signals to states of the set of actuator positions. The information processing system accurately accommodates to: (1) unforeseen changes in sensor and actuator parameters, (2) moderate amounts of signal noise in the processing elements of the apparatus and (3) complete failure of a minority of processing elements. For example, the system can utilize sound-frequency mapping, pressure-position mapping, motor-motor mapping and moreover, any modality can be utilized in accordance with the present invention, in short, any sensory mapping that is contiguous and ordered.

It will be appreciated that the instant specification and claims are set forth by way of illustration and not limitation, and that various modifications and changes may be made without departing from the spirit and scope of the present invention.

What is claimed is:

1. A method for adaptive visual-motor coordination in a multi-joint robot, comprising the steps of:
   a. providing two movable cameras and shifting the position of each camera with a plurality of first actuators;
   b. providing a multijoint arm having an end joint and moving the position of the arm at each joint with a plurality of second actuators;
   c. correlating the position of the camera with the position of the arm by:
      i. placing the end point of the arm in various random positions corresponding to a target map for the state of the second actuators;
      ii. moving the cameras to focus on the end point of the arm in each position to generate an input map for each camera corresponding to the state of the first actuators associated therewith;
      iii. producing a disparity map from the two input maps and
      iv. thereafter continuously modifying the input maps in accordance with the target map;
   d. focussing the cameras on a point in space and producing input maps corresponding thereto;
   e. producing a target map from the input maps produced in step (d) in accordance with the correlation of step (c); and
   f. moving the end point of the arm to the point in space in accordance with the target map produced in step (e).

2. The method according to claim 1, wherein the step of continuously modifying the input maps comprises modifying the input maps incrementally.

3. The method according to claim 1, wherein each of the maps comprises a distribution of analog values and wherein modification of the input maps is carried out for each of the analog values in parallel.

4. A method for adaptive visual-motor coordination and object recognition in a multi-joint robot, comprising the steps of:
   a. providing two movable cameras and shifting the position of each camera with a plurality of first actuators;
   b. providing a multijoint arm having an end joint and moving the position of the arm at each joint with a plurality of second actuators;
   c. correlating the position of the camera with the position of the arm by:
      i. placing a three dimensional object at the end point of the arm;
      ii. positioning the object in various random positions and orientation corresponding to a target map for the state of the second actuators;
      iii. moving the cameras to focus on the object in each orientation and position to generate an input map for each camera corresponding to the state of the first actuators associated therewith;
      iv. producing a disparity map from the two input maps and
      v. thereafter continuously modifying the input maps in accordance with the target map;

d. focussing the cameras on a three dimensional object in space and producing input maps corresponding thereto;

e. producing a target map from the input maps produced in step (d) in accordance with the correlation of step (c); and f. moving the end point of the arm to the three dimensions in space in accordance with the target map produced in step (e).

5. The method according to claim 4, wherein the step of continuously modifying the input maps comprises modifying the input maps incrementally.

6. The method according to claim 4, wherein each of the maps comprises a distribution of analog values and wherein modification of the input maps is carried out for each of the analog values in parallel.

7. A method for adaptive sensory-motor coordination in a multi-joint robot, comprising the steps of:

a. providing a multijoint arm having an end joint and moving the position of the arm at each joint with a plurality of actuators;

b. providing two sensors for sensing the position of the end point of the arm;

c. correlating the sensed position of the end point of the arm with the position of the arm by:

i. placing the end point of the arm in various random positions corresponding to a target map for the state of the actuators;

ii. sensing the end point of the arm in each position to generate an input map for each sensor corresponding to the values produced thereby;

iii. producing a disparity map from the two input maps and iv. thereafter continuously modifying the input maps in accordance with the target map;

d causing the sensors to sense a point in space and producing input maps corresponding thereto;

e. producing a target map from the input maps produced in step (d) in accordance with the correlation of step (c); and f. moving the end point of the arm to the point in space in accordance with the target map produced in step (e).

8. The method according to claim 7, wherein the step of continuously modifying the input maps comprises modifying the input maps incrementally.

9. The method according to claim 7, wherein each of the maps comprises a distribution of analog values and wherein modification of the input maps is carried out for each of the analog values in parallel.

10. A method for calibrating visual and motor functions in a robot having a body and at least one arm comprising limbs and joints connecting one limb to the body and the limbs to each other with one limb having a free end, the method comprising the steps of:

a. generating a target map of random values, the values corresponding to a single random orientation of the limbs relative to their joints;

b. orienting the limbs in the single random orientation;

c. visually sensing the position of the free end of the one limb and generating an input map of values corresponding to the visually sensed position;

d. correlating the input map to the target map;

e. continuously repeating steps a-d in sequence for different random orientations to generate a correspondence between all input maps and all target maps.

11. The method according to claim 10, wherein the correspondence is generated incrementally for each repetition of steps a-d.

12. The method according to claim 10, wherein the step of visually sensing comprises sighting the free end of the one limb with at least two movable cameras.

13. A method for calibrating visual and motor functions in a robot having a body and at least one arm comprising limbs and joints connecting one limb to the body and the limbs to each other with one limb having a free end for holding a three dimensional object, the method comprising the steps of:

a. generating a target map of random values, the values corresponding to a single random orientation of the limbs relative to their joints;

b. orienting the limbs in the single random orientation;

c. visually sensing the position of a three dimensional object held at the free end of the one limb and generating an input map of values corresponding to the visually sensed position;

d. correlating the input map to the target map;

e. continuously repeating steps a-d in sequence for different random orientations to generate a correspondence between all input maps and all target maps.

14. The method according to claim 13, wherein the correspondence is generated incrementally for each repetition of steps a-d.

15. The method according to claim 13, wherein the step of visually sensing comprises sighting the three dimensional object with at least two movable cameras.

16. A method for calibrating sensory and motor functions in a robot having a body and at least one arm comprising limbs and joints connecting one limb to the body and the limbs to each other with one limb having a free end, the method comprising the steps of:

a. generating a target map of random values, the values corresponding to a single random orientation of the limbs relative to their joints;

b. orienting the limbs in the single random orientation;

c. sensing the position of the free end of the one limb and generating an input map of values corresponding to the sensed position;

d. correlating the input map to the target map;

e. continuously repeating steps a-d in sequence for different random orientations to generate a correspondence between all input maps and all target maps.

17. The method according to claim 16, wherein the correspondence is generated incrementally for each repetition of steps a-d.

18. The method according to claim 16, wherein the step if visually sensing comprises sighting the free end of the one limb with at least two movable cameras.

* * * * *